(12) United States Patent
Jeong et al.

(10) Patent No.: US 8,770,638 B2
(45) Date of Patent: Jul. 8, 2014

(54) BUMPER BEAM ASSEMBLY FOR VEHICLE

(75) Inventors: Phil Jung Jeong, Yongin-si (KR); Jun Mo Ku, Hwaseong-si (KR); Jin Ho Kim, Suwon-si (KR); Jong Myung Lim, Cheongju-si (KR); Sang Wook Nam, Seoul (KR)

(73) Assignees: Hyundai Motor Company, Seoul (KR); Kia Motors Corp., Seoul (KR); Hanwha L&C Corporation, Seoul (KR)

( * ) Notice: Subject to any disclaimer, the term of this patent is extended or adjusted under 35 U.S.C. 154(b) by 0 days.

(21) Appl. No.: 13/545,763

(22) Filed: Jul. 10, 2012

(65) Prior Publication Data

US 2013/0154285 A1 Jun. 20, 2013

(30) Foreign Application Priority Data

Dec. 15, 2011 (KR) .......................... 10-2011-0135549

(51) Int. Cl.
*B60R 19/34* (2006.01)

(52) U.S. Cl.
USPC ........................................................ 293/133

(58) Field of Classification Search
USPC ......... 293/133, 102, 109, 117, 120, 121, 132, 293/155, 122; 29/897.2; 180/274; 188/377; 296/187.03, 187.09, 203.02

See application file for complete search history.

(56) References Cited

U.S. PATENT DOCUMENTS

| | | | | |
|---|---|---|---|---|
| 6,065,786 | A * | 5/2000 | Wheatley | 293/109 |
| 7,794,006 | B2 * | 9/2010 | Karlander | 296/102 |
| 2003/0189343 | A1 * | 10/2003 | Evans et al. | 293/120 |
| 2004/0145195 | A1 * | 7/2004 | Mooijman et al. | 293/120 |
| 2004/0169381 | A1 * | 9/2004 | Evans et al. | 293/121 |
| 2006/0125250 | A1 * | 6/2006 | Evans | 293/121 |
| 2006/0244273 | A1 * | 11/2006 | Evans | 293/102 |
| 2006/0284431 | A1 * | 12/2006 | Evans et al. | 293/121 |
| 2007/0108778 | A1 * | 5/2007 | Evans et al. | 293/120 |
| 2009/0273197 | A1 * | 11/2009 | Muskos | 293/132 |
| 2012/0104778 | A1 * | 5/2012 | Mana et al. | 293/133 |
| 2013/0106139 | A1 * | 5/2013 | Nagwanshi et al. | 296/187.03 |
| 2013/0154287 | A1 * | 6/2013 | Lee et al. | 293/133 |
| 2013/0175813 | A1 * | 7/2013 | Mana et al. | 293/120 |

FOREIGN PATENT DOCUMENTS

| | | |
|---|---|---|
| KR | 1020100104457 A | 9/2010 |
| WO | WO 2009/037787 A1 | 3/2009 |

* cited by examiner

*Primary Examiner* — Kiran B Patel
(74) *Attorney, Agent, or Firm* — Morgan, Lewis & Bockius LLP

(57) ABSTRACT

A bumper beam assembly for a vehicle may include a back beam disposed inside a vehicle bumper, both distal ends of the back beam being oriented in a lateral direction of a main body of the vehicle, crash boxes coupled to one side of the back beam, the crash boxes protruding from the both distal ends of the back beam toward the bumper, and back beam stays integrally coupled to the other side of the back beam, the back beam stays protruding from the both distal ends of the back beam toward an inside of the vehicle, in a direction opposite to a direction in which the crash boxes protrude.

9 Claims, 6 Drawing Sheets

BUMPER BEAM ASSEMBLY FOR VEHICLE

CROSS-REFERENCE TO RELATED APPLICATIONS

The present application claims priority to Korean Patent Application No. 10-2011-0135549 filed on Dec. 15, 2011, the entire contents of which is incorporated herein for purposes by this reference.

BACKGROUND OF THE INVENTION

1. Field of the Invention

The present invention relates, in general, to a bumper beam assembly for a vehicle and, more particularly, to a bumper beam assembly for a vehicle, which has excellent ability to absorb crash energy.

2. Description of Related Art

A bumper beam assembly is mounted on the front or rear end of a vehicle as part of an attempt to protect the main body of a vehicle as well as the occupants against a crash. As shown in FIG. 1, the bumper beam assembly of the related art includes a back beam 1 extending in the lateral direction of the main body of the vehicle, the back beam being made of glass mat reinforced thermoplastic (GMT), and crash boxes 2 coupled on both ends of the back beam 1. Each crash box 2 protrudes towards the inside of the vehicle (in the direction toward the interior space of the vehicle), and is made of a steel.

The crash box 2 is configured such that it is coupled to a side member 3, which forms a part of the main body.

The bumper beam assembly, which is configured as above, is required to satisfy safety regulations about crash performance. Tests for such crash performance include, for example, the Insurance Institute for Highway Safety (IIHS) test, in which front crash and 15%-offset crash are performed, and the Research Council for Automobile Repairs (RCAR) test, in which a 40%-offset crash is performed.

At the front and 15%-offset crash tests, most crash energy is absorbed first by the back beam 1 of the bumper beam assembly of the related art, and the rest of the crash energy is absorbed by the crash boxes 2.

At the 40%-offset crash test, most of the crash energy is absorbed by the crash boxes 2.

In the bumper beam assembly of the related art, the crash boxes 2 must be configured such that they participate in absorbing crash energy in the front and 15% offset crash tests and the 40%-offset crash test. Accordingly, the crash boxes 2 must be fabricated such that they have high rigidity.

However, a drawback of the highly-rigid crash boxes 2 is that they fail to sufficiently absorb crash energy. Consequently, as the amount of the crash energy that is transferred toward the main body of the vehicle increases, there is increased damage to the side member 3 and the vehicle body panel.

The information disclosed in this Background of the Invention section is only provided to enhance the understanding of the background of the invention, and should not be taken as an acknowledgment or any form of suggestion that this information forms the prior art that would already be known to those skilled in the art.

BRIEF SUMMARY

Various aspects of the present invention are directed to providing a bumper beam assembly for a vehicle, which is configured such that it can significantly reduce the amount of crash energy that is transferred toward the main body of the vehicle at a front, 15%-offset or 40%-offset crash, thereby reducing damage to the main body of the vehicle, as well as further increasing the ability to protect occupants.

In an aspect of the present invention, a bumper beam assembly for a vehicle may include a back beam disposed inside a vehicle bumper, both distal ends of the back beam being oriented in a lateral direction of a main body of the vehicle, crash boxes coupled to one side of the back beam, the crash boxes protruding from the both distal ends of the back beam toward the bumper, and back beam stays integrally coupled to the other side of the back beam, the back beam stays protruding from the both distal ends of the back beam toward an inside of the vehicle, in a direction opposite to a direction in which the crash boxes protrude.

The back beam is bent such that a center portion thereof protrudes further toward an outside of the vehicle, in which the bumper is located, than the both distal ends thereof to which the crash boxes are coupled.

The back beam may have a C-shaped cross-section that is open toward the inside of the vehicle.

The back beam may include back beam-holes in the both distal ends thereof, the back beam-holes being open toward the inside and an outside of the vehicle, and base surfaces each formed in an inner circumference of the respective back beam-holes, wherein each of the crash boxes are seated on and coupled to a corresponding base surface respectively, wherein each of the back beam stays is connected to a corresponding base surface respectively.

Each of the crash boxes is divided into a plurality of divided spaces by a plurality of vertical partitions and a plurality of horizontal partitions therein.

Each of the back beam stays is coupled to a side member, which forms a part of the main body of the vehicle.

Each of the back beam stays and the crash boxes are aligned along a longitudinal axis of the side member.

The back beams and the back beam stays are made of glass mat reinforced thermoplastic, and the crash boxes are made of high density polyethylene.

A cross-sectional thickness, a length of a protrusion toward the inside of the vehicle, an outer inclination angle and an inner inclination angle of each of the back beam stays satisfy 4 mm to 6 mm, 35 mm to 40 mm, 20° to 25°, and 30° to 35°, respectively, in order to minimize a degree to which a vehicle body panel intrudes into a space in the inside of the vehicle as well as an amount of crash energy that is transferred toward the main body of the vehicle through a side member.

Each of the crash boxes may include a base section, which is seated on and coupled to the respective base surfaces in order to cover a respective one of the back beam-holes, and an extension, which is integrally formed with the base section such that the extension extends beyond the back beam-hole toward the center section of the back beam along the one side of the back beam.

Each of the back beam stays may have a C-shaped cross section, with a portion thereof being connected to a respective one of the base surfaces, such that the back beam stay is open in a direction toward the outside of the vehicle through the back beam-hole but is closed in a direction toward the inside of the vehicle to form a crash-absorbing space defined therein.

According to embodiments of the invention, the bumper beam assembly for a vehicle is configured such that crash energy that occurs at a crash event can be dispersed to and absorbed by the back beam, the crash boxes and the back beam stays. This configuration makes it possible to minimize the degree to which the vehicle body panel intrudes into the space in the inside of the vehicle, minimize the amount of the crash energy that is transferred to the main body of the vehicle through the side member, and thus maximize the ability to protect the occupants.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
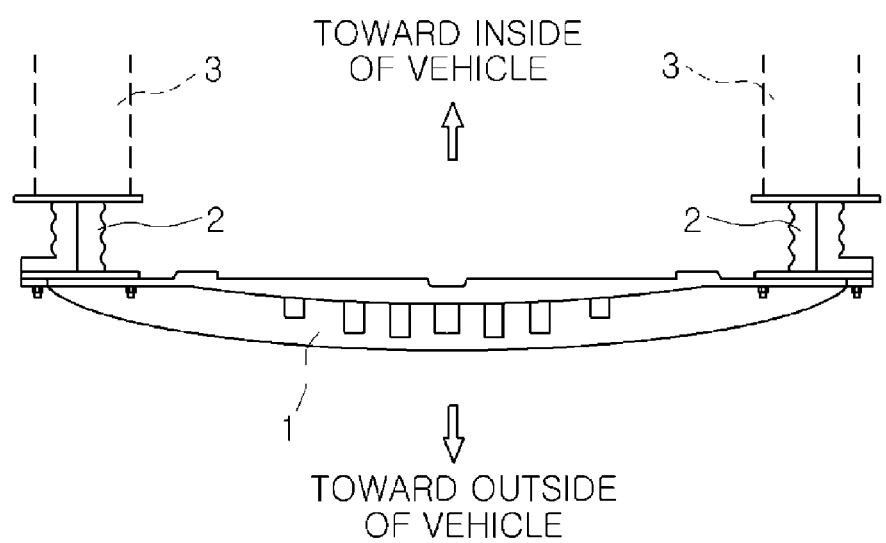
FIG. 1 is a view depicting a bumper beam assembly for a vehicle of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to a bumper beam assembly for a vehicle of the invention, exemplary embodiments of which are illustrated in the accompanying drawings. Wherever possible, the same reference numerals will be used throughout the drawings and the description to refer to the same or like parts.

Figure 2:
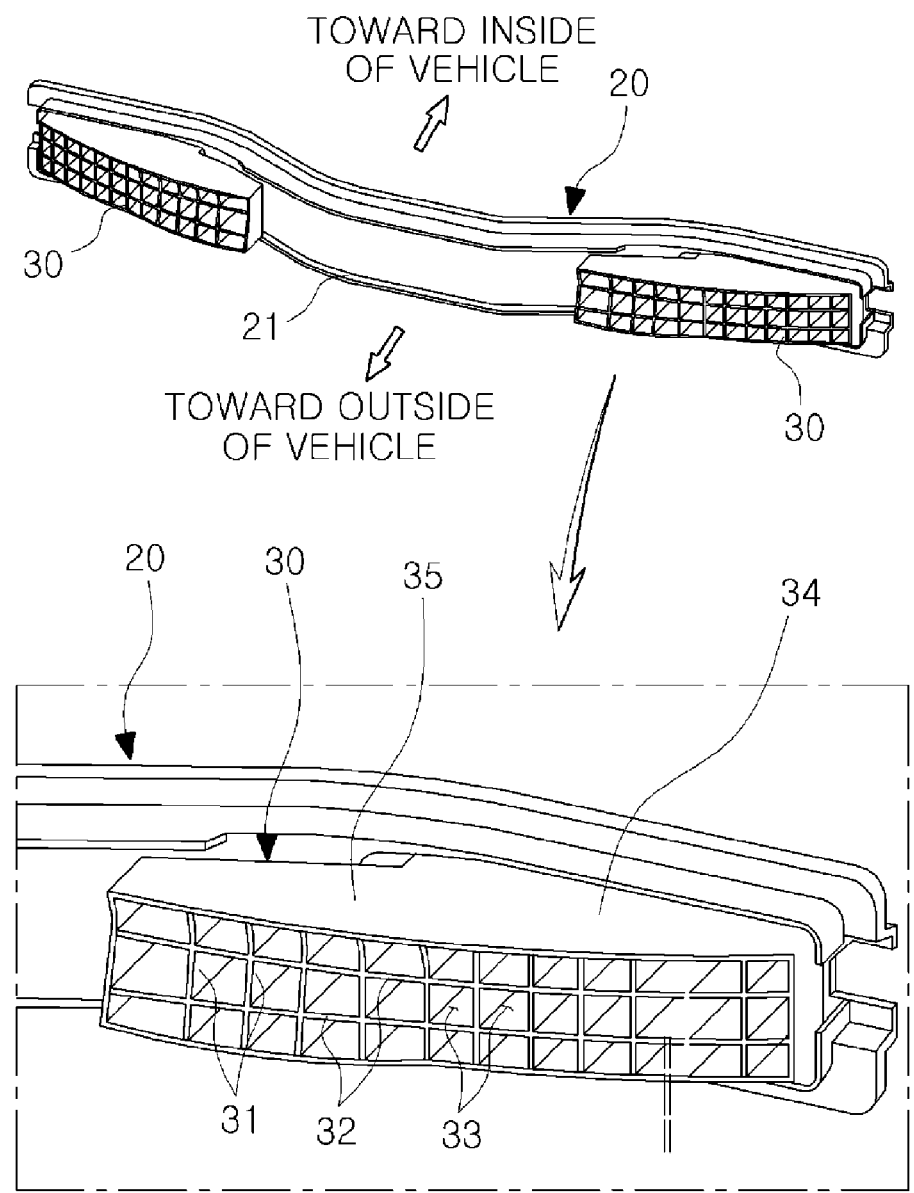
FIG. 2 is a perspective view depicting a bumper beam assembly for a vehicle according to an exemplary embodiment of the invention.
Figure 3:
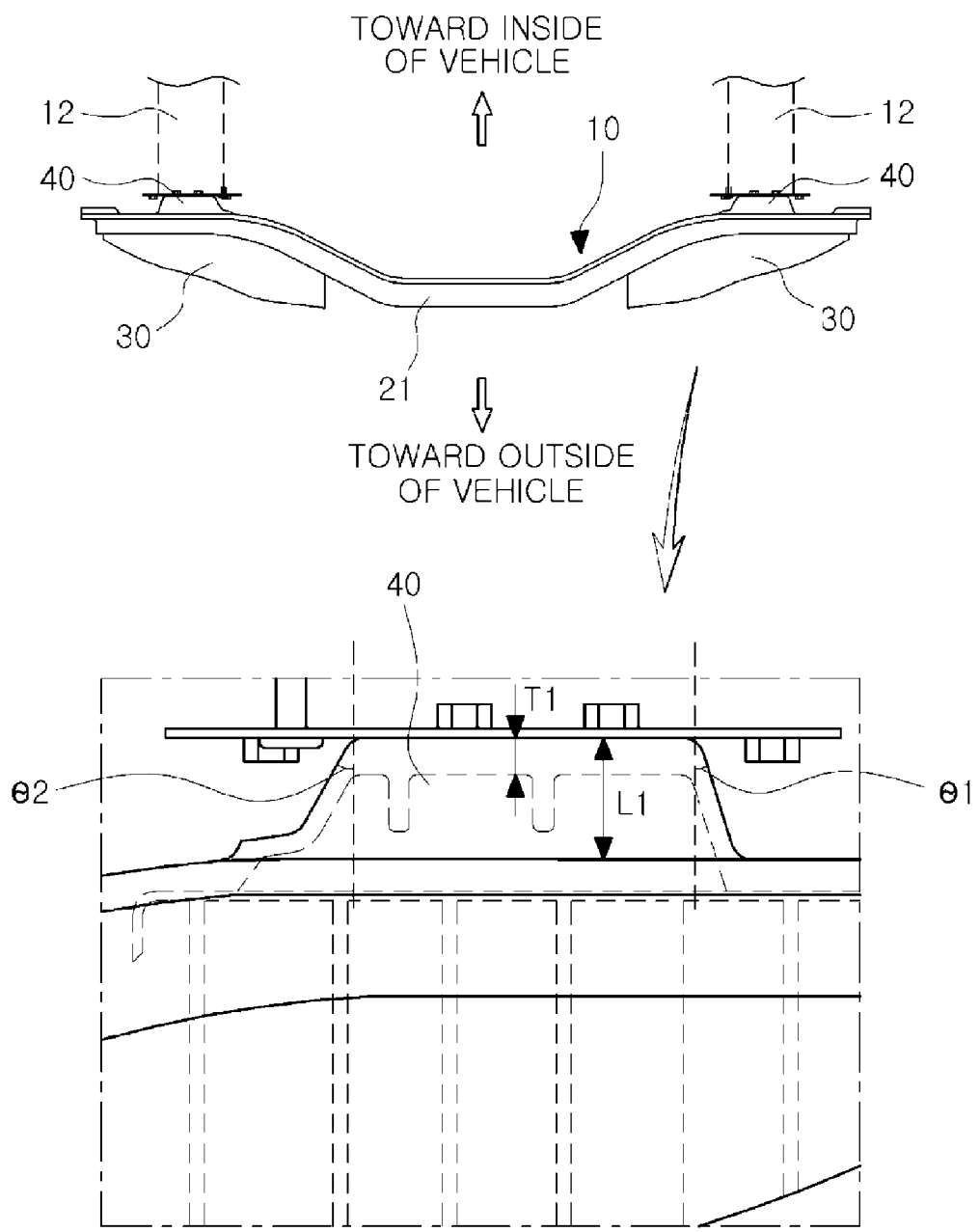
FIG. 3 is a top plan view of FIG. 2.
Figure 4:
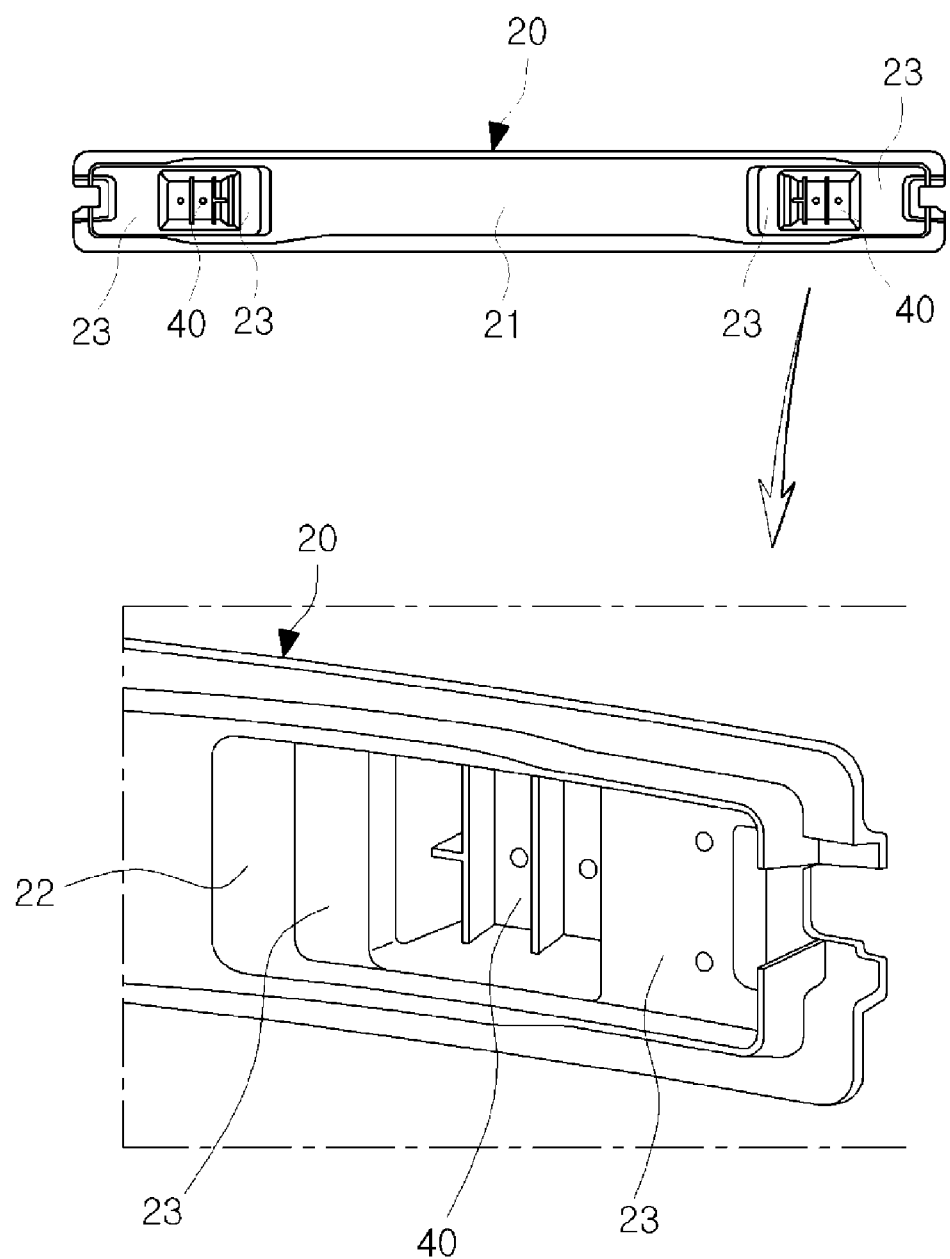
FIG. 4 is a view of the bumper beam assembly shown in FIG. 2 from which the crash boxes are removed.
Figure 6:
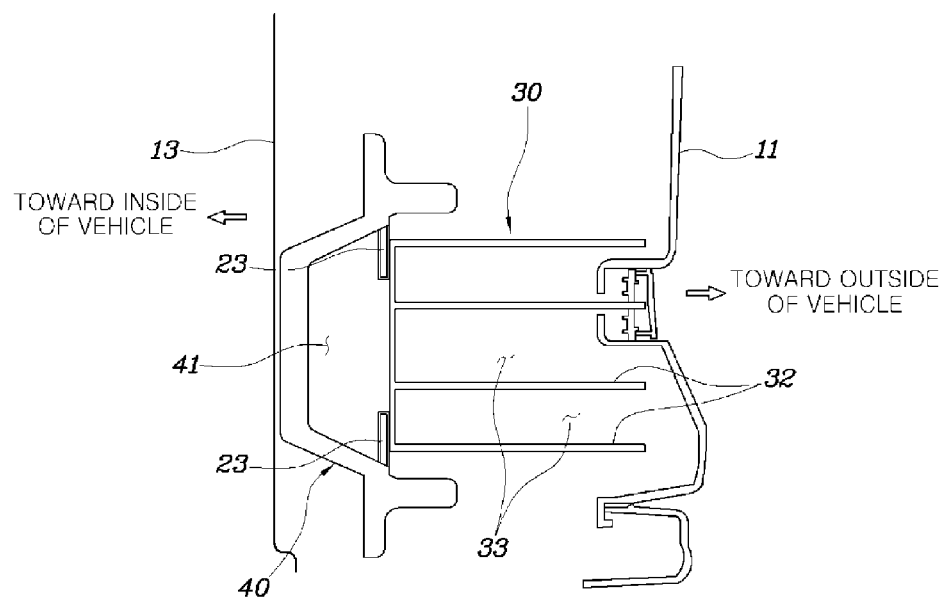
FIG. 6 is a cross-sectional view depicting the state in which a bumper beam assembly according to an exemplary embodiment of the invention is installed in the bumper of a vehicle, in which the end of the back beam is cut.

As shown in FIG. 2 and FIG. 6, the bumper beam assembly for a vehicle according to an exemplary embodiment of the invention includes a back beam 20 disposed inside a vehicle bumper 11, both ends of the back beam 20 being oriented in the lateral direction of the main body of the vehicle, crash boxes 30 coupled to one side of the back beam 20, the crash boxes 30 protruding from both ends of the back beam 20 toward the bumper 11 (toward the outside of the vehicle), and back beam stays 40 integrally coupled to the other side of the back beam 20, the back beam stays 40 protruding from both ends of the back beam 20 toward the inside of the vehicle, in the direction opposite to that in which the crash boxes 30 protrude.

Thus, the crash boxes 30 are provided on both ends of the one side of the back beam 20 that faces the outside of the vehicle with respect to the back beam, and the back beam stays 40 are provided on both ends of the other side of the back beam 20 that faces the inside of the vehicle.

Here, the back beams 20 and the back beam stays 40 are made of glass mat reinforced thermoplastic (GMT), and the crash boxes 30 are made of high density polyethylene (HDPE).

Although the strength, endurance and elasticity of the GMT material and the HDPE material are similar to those of a steel material, the GMT material and the HDPE material have such merits as being light in weight and having a high degree of design freedom. Therefore, advantages of the bumper beam assembly of the invention are that it can reduce weight and increase fuel efficiency.

In addition, the back beam stay 40 is coupled to a side member 12, which forms a part of the main body of the vehicle.

Figure 5:
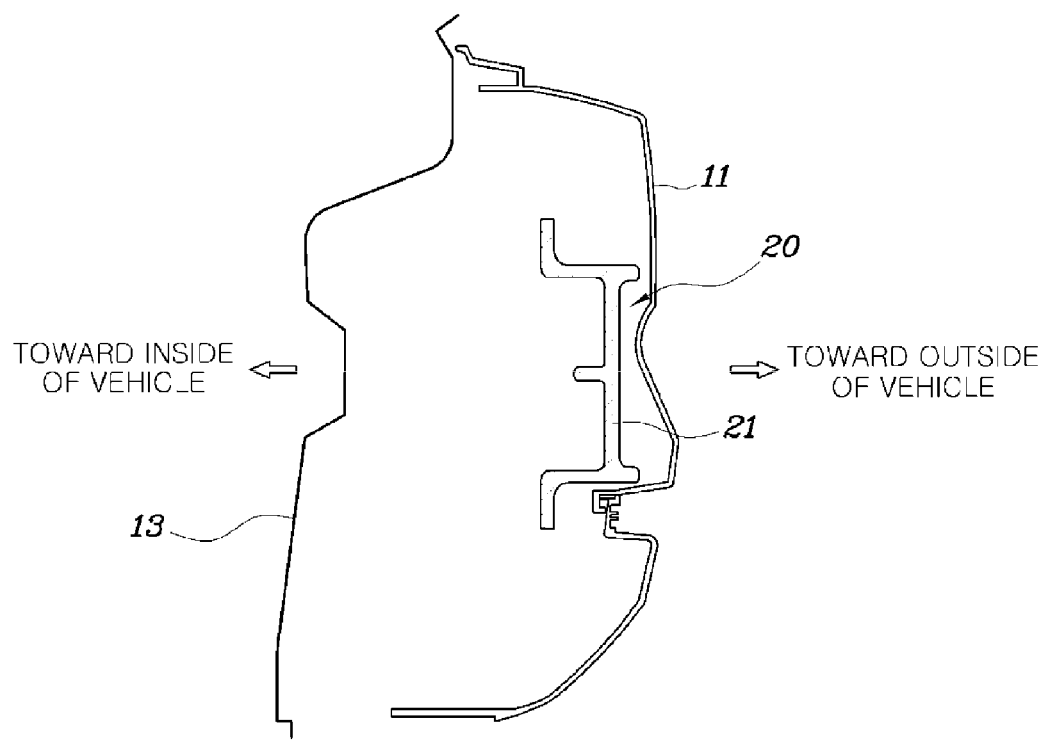
FIG. 5 is a cross-sectional view depicting the state in which a bumper beam assembly according to an exemplary embodiment of the invention is installed inside the bumper of a vehicle, in which the center section of the back beam is cut.

The back beam 20 is bent such that the center portion 21 in the central portion thereof protrudes in the direction toward the outside of the vehicle, in which the bumper 11 is located, more so than both ends thereof to which the crash boxes 30 are coupled. This structure, shown in FIG. 5, positions the center portion 21 of the back beam 20 closer to the bumper 11 but, in contrast, spaces it apart from a vehicle body panel 13.

Therefore, even if the center portion 21 of the back beam 20 is pushed toward the inside of the vehicle by crash energy, the long distance between the center portion 21 and the vehicle body panel 13 can minimize the degree to which the vehicle body panel 13 is pushed inward, thereby further improving the ability to protect occupants.

The back beam 20 is configured such that it has a C-shaped cross-section that is open in the direction toward the inside of the vehicle. The C-shaped cross-section of the back beam 20 is a structure that makes the back beam 20 light as well as one that provides a sufficient amount of rigidity to sustain crash energy.

Back beam-holes 22, which are open in the direction toward the inside and the outside of the vehicle, are formed in both ends of the back beam 20. A base surface 23 is formed in each back beam-hole 22 such that each crash box 30 is seated on and coupled to the base surface 23. With this configuration, the back beam stay 40 is connected to the base surface 23.

Accordingly, the back beam stay 40 has the C-shaped cross section due to its connection to the base surface 23, such that the back beam stay 40 is open in the direction toward the outside of the vehicle through the back beam-hole 22 but is closed in the direction toward the inside of the vehicle. This configuration also defines a crash-absorbing space 41 in the back beam stay 40.

The inner crash-absorbing space 41 of the back beam stay 40 can lead to the shape of the back beam stay being changed in an efficient manner by crash energy and it efficiently absorbing the crash energy, thereby significantly reducing the amount of crash energy that is transferred toward the side member 12.

The crash box 30 is configured such that the inside thereof is divided into a plurality of divided spaces 33 by a plurality of vertical partitions 31 and a plurality of horizontal partitions 32.

The divided spaces 33 of the crash box 30 serve to prevent the crash box 30 from being abruptly collapsed by crash energy as well as to sufficiently absorb crash energy, thereby significantly reducing the amount of crash energy that is transferred toward the side member 12.

In addition, the crash box 30 has a base section 34, which is seated on and coupled to the base surface 23 to cover the back beam-hole 22, and an extension 35, which is integrally formed with the base section 34 such that it extends beyond the back beam-hole 22 toward the center section 21 of the back beam 20.

The base section 34 of the crash box 30 can absorb crash energy that is directed towards the back beam-hole 22 where the back beam stay 40 is located, whereas the extension 35 of the crash box 30 can absorb crash energy that is transferred toward the surroundings of the back beam-hole 22.

The extension 35 also serves to reinforce the rigidity of a corresponding end of the back beam 20 that is reduced by the presence of the back beam-hole 22.

In an exemplary embodiment of the present invention, each of the back beam stays 40, and the crash boxes 30 are aligned along a longitudinal axis of the side member 12.

In order to minimize a degree to which the vehicle body panel 13 intrudes into the space in the inside of the vehicle as well as the amount of crash energy that is transferred toward the main body of the vehicle through the side member 12, in the back beam stay 40 of the invention, it is preferable that the thickness T1 of the cross-section, the length L1 of the protrusion toward the inside of the vehicle, the outer inclination angle $\theta 1$ and the inner inclination angle $\theta 2$ satisfy 4 mm to 6 mm, 35 mm to 40 mm, 20° to 25°, and 30° to 35°, respectively.

If the thickness T1 of the cross-section of the back beam stay 40 is 4 mm or less, the amount of crash energy that is transferred toward the main body of the vehicle is decreased since the ability to absorb crash energy is increased, whereas the degree to which the vehicle body panel 13 intrudes into the space in the inside of the vehicle increases due to the problem of a decreased amount of rigidity. If the thickness T1 of the cross-section of the back beam stay 40 is 6 mm or less, the degree to which the vehicle body panel 13 intrudes into the space in the inside of the vehicle decreases due to an increased amount of rigidity, whereas the amount of crash energy that is transferred toward the main body of the vehicle is greatly increased since the ability to absorb crash energy is decreased.

Although the length L1 of the protrusion of the back beam stay 40 does not have a great effect on the transfer of crash energy to the main body of the vehicle through the side member 12, it is preferable that the length L1 be set in the range of from 35 mm to 40 mm in order to minimize the amount of the vehicle body panel 13 to introduce into the space in the inside of the vehicle.

If the outer inclination angle $\theta 1$ of the back beam stay 40 is set to 20° or less, the amount of crash energy that is transferred to the main body of the vehicle through the side member 12 decreases, whereas the degree to which the vehicle body panel 13 intrudes into the space in the inside of the vehicle increases. If the outer inclination angle $\theta 1$ of the back beam stay 40 is set to 25° or more, the degree to which the vehicle body panel 13 intrudes into the space in the inside of the vehicle decreases, whereas the amount of crash energy that is transferred to the main body of the vehicle through the side member 12 increases.

If the inner inclination angle $\theta 2$ of the back beam stay 40 of the invention is set to 30° or less, the degree to which the vehicle body panel 13 intrudes into the space in the inside of the vehicle decreases, whereas the amount of crash energy that is transferred to the main body of the vehicle through the side member 12 increases. If the inner inclination angle $\theta 2$ of the back beam stay 40 of the invention is set to 35° or more, the amount of crash energy that is transferred to the main body of the vehicle through the side member 12 decreases, whereas the degree to which the vehicle body panel 13 intrudes into the space in the inside of the vehicle increases.

Accordingly, in the back beam stay 40 of the invention, it is preferable that the thickness T1 of the cross-section, the length L1 of the protrusion toward the inside of the vehicle, the outer inclination angle $\theta 1$ and the inner inclination angle $\theta 2$ satisfy 4 mm to 6 mm, 35 mm to 40 mm, 20° to 25°, and 30° to 35°, respectively, in order to minimize the degree to which the vehicle body panel 13 intrudes into the space in the inside of the vehicle as well as the amount of crash energy that is transferred toward the main body of the vehicle through the side member 12.

In the bumper beam assembly of the invention having the above-described configuration, most crash energy that occurs at a front or 15%-offset crash is absorbed first by the back beam 20, and the rest of the crash energy is absorbed by the back beam stay 40.

In a 40%-offset crash, most crash energy that occurs is absorbed by the crash box 30 and the rest of the crash energy is absorbed by the back beam stay 40.

Accordingly, in the bumper beam assembly of the invention, crash energy that occurs at the front or 15%-offset crash can be dispersed to and absorbed by the back beam 20 and the back beam stay 40. Crash energy that occurs at the 40%-offset crash can be dispersed to and absorbed by the crash box 30 and the back beam stay 40.

Since all crash energy at the crash events as described above can be dispersed to and absorbed by the back beam 20, the crash box 30 and the back beam stay 40, it is possible for the bumper beam assembly to maintain a sufficient amount of rigidity, thereby preventing the crash box 30 and the back beam stay 40 from abruptly collapsing. This can consequently minimize the degree to which the vehicle body panel 13 intrudes into the space in the inside of the vehicle, thereby most safely protecting occupants.

Furthermore, since the crash energy is absorbed in the dispersed form, the ability to absorb crash energy can be increased, thereby minimizing the amount of the crash energy that is transferred to the main body of the vehicle through the side member 12, thus maximizing the ability to protect occupants.

Although the exemplary embodiments of the present invention have been described for illustrative purposes, those skilled in the art will appreciate that various modifications, additions and substitutions are possible, without departing from the scope and spirit of the invention as disclosed in the accompanying claims.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A bumper beam assembly for a vehicle comprising:
a back beam disposed inside a vehicle bumper, both distal ends of the back beam being oriented in a lateral direction of a main body of the vehicle;
crash boxes coupled to one side of the back beam, the crash boxes protruding from the both distal ends of the back beam toward the bumper; and
back beam stays integrally coupled to the other side of the back beam, the back beam stays protruding from the both distal ends of the back beam toward an inside of the vehicle, in a direction opposite to a direction in which the crash boxes protrude;
wherein the back beam includes:
back beam holes in the both distal ends thereof, the back beam holes being open toward the inside and an outside of the vehicle; and
base surfaces each formed in an inner circumference of the respective back beam holes, wherein each of the crash boxes are seated on and coupled to a corresponding base surface respectively;
wherein each of the back beam stays is connected to a corresponding base surface respectively;
wherein each of the back beam stays has a C-shaped cross section, with a portion thereof being connected to a respective one of the base surfaces; and
wherein the back beam stay is open in a direction toward the outside of the vehicle through the back beam hole but is closed in a direction toward the inside of the vehicle to form a crash-absorbing space defined therein.

2. The bumper beam assembly of claim 1, wherein the back beam is bent such that a center portion thereof protrudes further toward an outside of the vehicle, in which the bumper is located, than the both distal ends thereof to which the crash boxes are coupled.

3. The bumper beam assembly of claim 1, wherein the back beam has a C-shaped cross-section that is open toward the inside of the vehicle.

4. The bumper beam assembly of claim 1, wherein each of the crash boxes is divided into a plurality of divided spaces by a plurality of vertical partitions and a plurality of horizontal partitions therein.

5. The bumper beam assembly of claim 1, wherein each of the back beam stays is coupled to a side member, which forms a part of the main body of the vehicle.

6. The bumper beam assembly of claim 5, wherein each of the back beam stays and the crash boxes are aligned along a longitudinal axis of the side member.

7. The bumper beam assembly of claim 1, wherein the back beams and the back beam stays are made of glass mat reinforced thermoplastic, and the crash boxes are made of high density polyethylene.

8. The bumper beam assembly of claim 1, wherein a cross-sectional thickness, a length of a protrusion toward the inside of the vehicle, an outer inclination angle and an inner inclination angle of each of the back beam stays satisfy 4 mm to 6 mm, 35 mm to 40 mm, 20° to 25°, and 30° to 35°, respectively, in order to minimize a degree to which a vehicle body panel intrudes into a space in the inside of the vehicle as well as an amount of crash energy that is transferred toward the main body of the vehicle through a side member.

9. The bumper beam assembly of claim 1, wherein each of the crash boxes includes:
a base section, which is seated on and coupled to the respective base surfaces in order to cover a respective one of the back beam holes; and
an extension, which is integrally formed with the base section such that the extension extends beyond the back beam-hole toward the center section of the back beam along the one side of the back beam.

* * * * *